United States Patent [19]

Holmes

[11] Patent Number: 4,756,217
[45] Date of Patent: Jul. 12, 1988

[54] TRAVELLING PIPE CUT-OFF

[75] Inventor: Dennis G. Holmes, Hayward, Calif.
[73] Assignee: Pacific Roller Die Co., Inc., Hayward, Calif.
[21] Appl. No.: 13,726
[22] Filed: Feb. 9, 1987
[51] Int. Cl.$^4$ ............................................. B23B 37/00
[52] U.S. Cl. ..................................... 82/53.1; 82/46; 493/289
[58] Field of Search .................. 82/53.1, 56, 57, 58, 82/46, 47, 48, 21 R, 84, 101; 266/57, 61, 56, 54, 58, 48

[56] References Cited

U.S. PATENT DOCUMENTS

| | | |
|---|---|---|
| 3,747,446 | 7/1973 | Davis .................................. 82/53.1 |
| 3,771,393 | 11/1973 | Gatto et al. ........................ 82/53.1 |
| 4,052,039 | 10/1977 | Koyano et al. ...................... 266/57 |
| 4,349,182 | 9/1982 | Blackburn ........................... 266/57 |

Primary Examiner—Frederick R. Schmidt
Assistant Examiner—Lawrence Cruz
Attorney, Agent, or Firm—Ernest M. Anderson

[57] ABSTRACT

A travelling pipe cut-off is described having a pair of knife-edged rollers mounted on a carriage that also supports a cut-off torch. At least one roller is engaged with the smooth surface of the pipe at all times during cut-off, each such roller advancing the carriage while the pipe is being advanced. The two rollers are spaced apart such that, as the bulge of a pipe seam approaches one of the rollers, that roller is moved out of engagement with the pipe, but the other roller remains in engagement. The carriage and cut-off mechanism is, therefore, advanced only by that roller which is engaged with a smooth surface of the pipe.

7 Claims, 5 Drawing Sheets

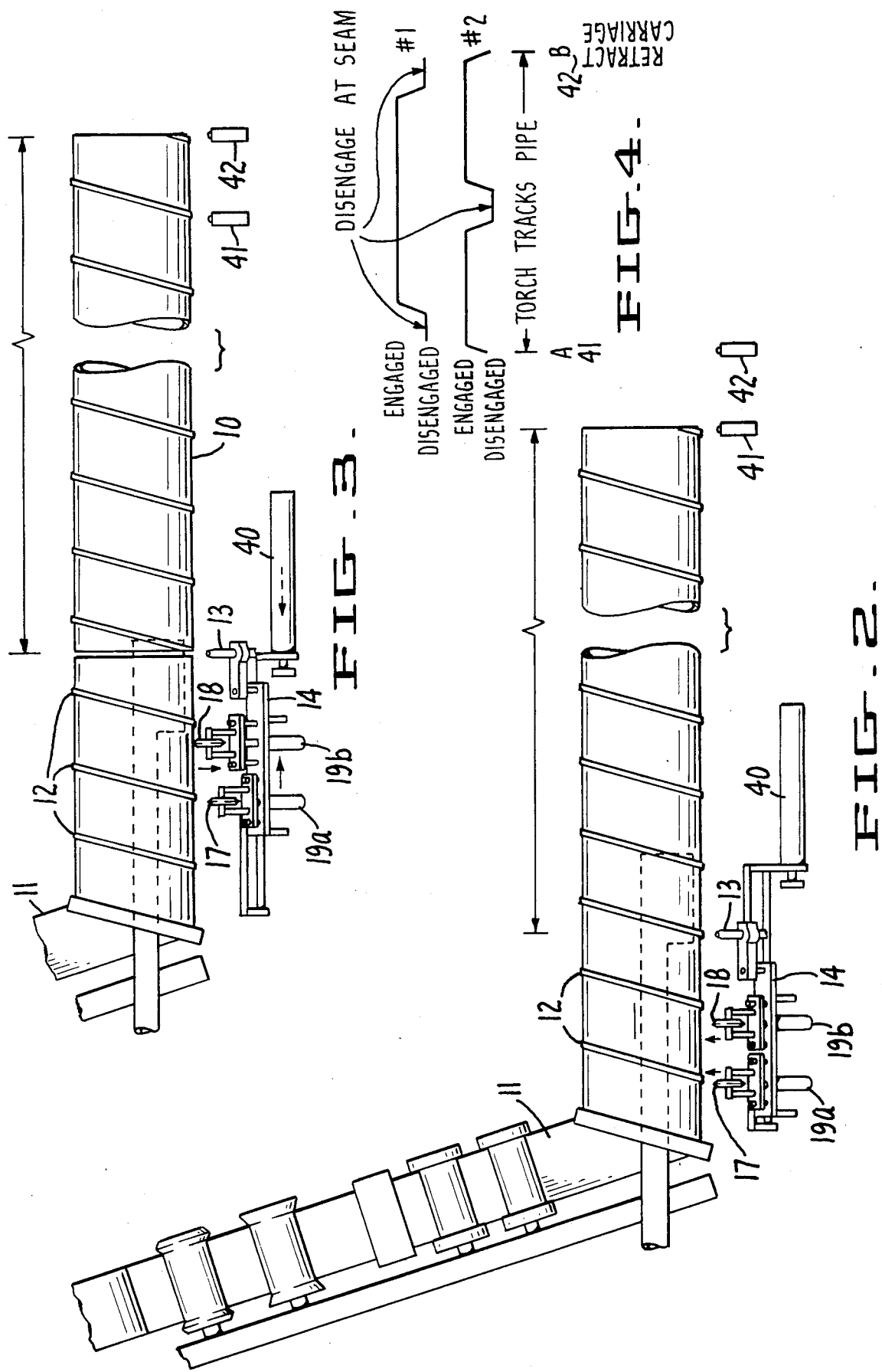

TRAVELLING PIPE CUT-OFF

BACKGROUND OF THE INVENTION

This invention relates to apparatus for cutting off sections of helically formed pipe while the pipe is "on the fly" in the course of manufacture. Apparatus of this general type is known which employs a carriage that supports a cut-off mechanism or torch, the carriage and torch being advanced parallel to the axis of the pipe as the manufactured portion is advanced axially and rotationally. A knife wheel or contact mounted to the carriage engages the pipe and advances the carriage with the pipe. Thus, the cut-off mechanism is also advanced with the pipe, and one complete rotation of the pipe is usually sufficient to completely sever the leading pipe section from a trailing portion. An apparatus of this kind is shown and described in U.S. Pat. No. 3,747,446.

BRIEF SUMMARY OF THE INVENTION

The present invention overcomes some of the problems encountered with the prior art apparatus. More specifically, the process of making helical pipe causes strip material to be helically coiled and helically seamed as by forming a lock seam or a weld. In either instance, the seaming produces a bulge on the exterior surface of the pipe and such bulges tend to create erratic behavior when engaged by the knife wheel or contact that moves the carriage. As a consequence, the pipe ends are not always cut-off square to the pipe axis; and in many instances the cut-off is either jagged or cut on a spiral.

The present invention provides a novel apparatus having a pair of roller contacts, at least one roller being in contact with the smooth surface of the pipe at all times during cut-off. The two rollers are spaced apart such that, as the bulge of a seam approaches one of the rollers, that roller is moved out of engagement with the pipe, but the other roller remains in engagement. The carriage and cut-off mechanism is, therefore, advanced only by that roller which is engaged with a smooth surface of the pipe.

One object of the present invention is to provide an apparatus for advancing the cut-off mechanism with advancement of helical pipe as it is being manufactured and to provide a constant rate of advancement and cut-offs which are perpendicular to the axis of the pipe.

Another object is to provide an apparatus for advancing a cut-off mechanism that comprises a pair of rollers, one or the other roller being engaged with a smooth surface of the pipe during the cut-off operation, neither roller being engaged at a point in time when a seam passes thereunder.

A further object of the invention is to provide an apparatus of the kind described that is operational and functional in the manufacture of helical pipe of different sizes.

Other object of this invention will become apparent in view of the following detailed description.

BRIEF DESCRIPTION OF DRAWINGS

In the drawings formally a part of this application and in which like parts are identified by like reference numerals throughout the same.

FIG. 2 is a top plan view of the apparatus illustrating its positional relationship to the strip feeding and helical forming process;

FIG. 3 is a second top plan view illustrating a second positional relationship of the apparatus;

FIG. 4 is a diagrammatic view illustrating the relative positions of a pair of rollers during one cut-off cycle;

DESCRIPTION OF THE PREFERRED EMBODIMENT

Figure 1:
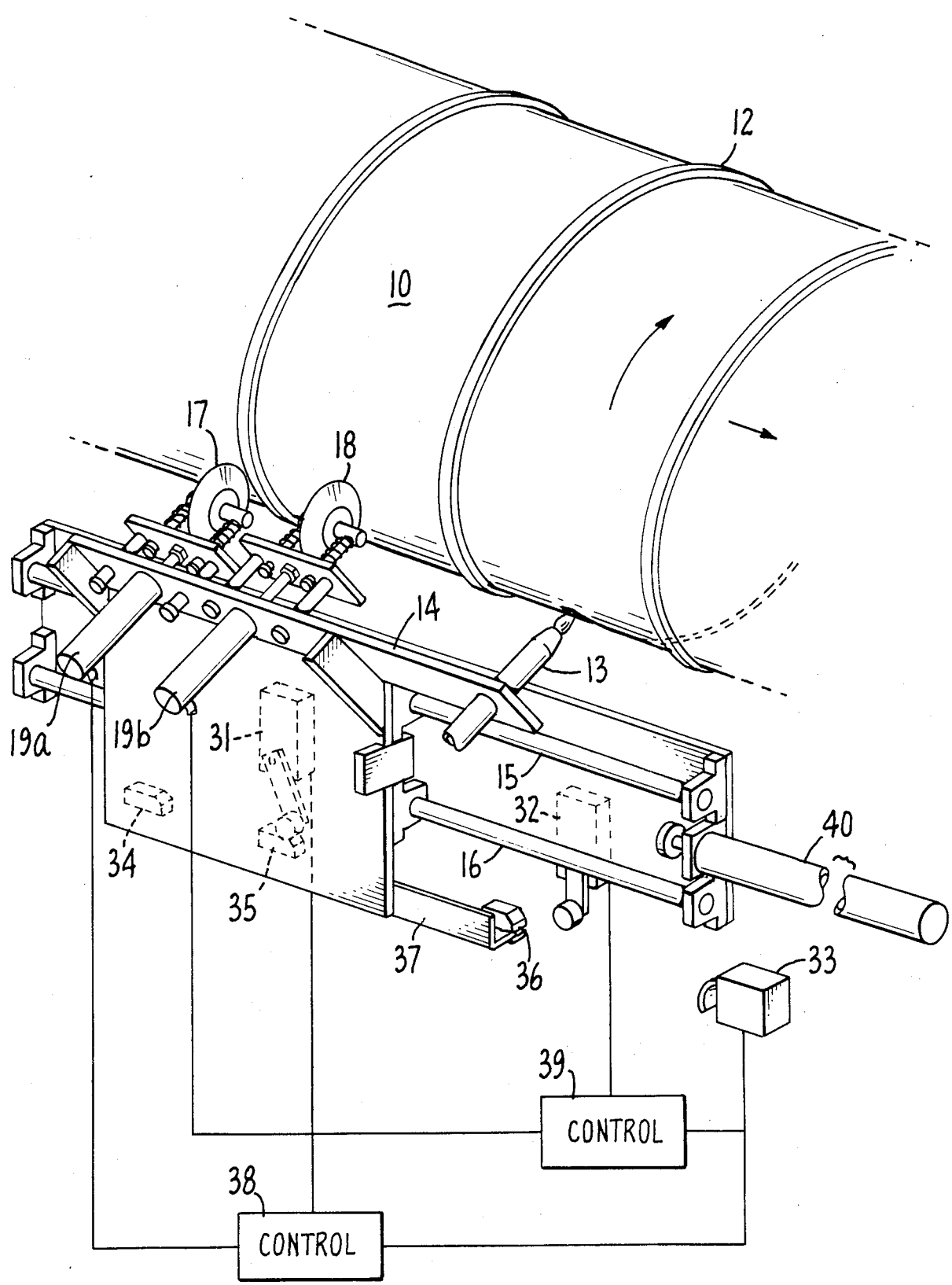
FIG. 1 is a perspective view of a preferred embodiment of the invention in apparatus for advancing a cut-off mechanism for forming helical pipe.
Figure 5:
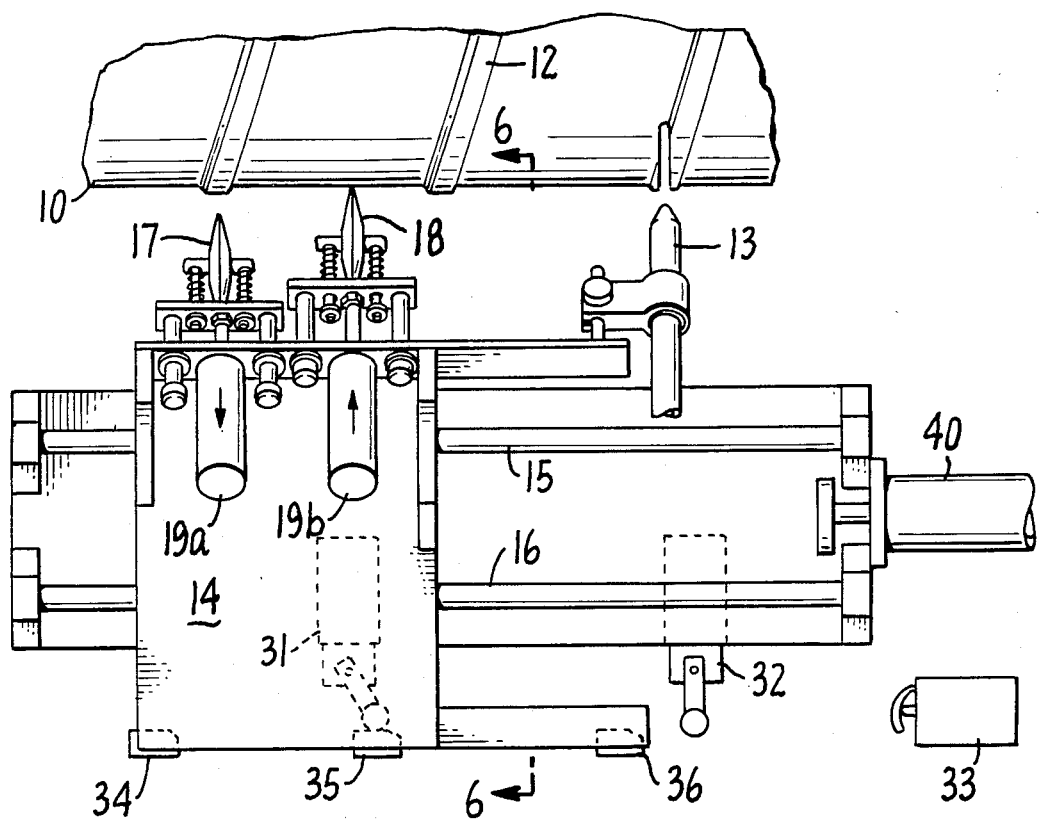
FIG. 5 is a side view of the apparatus positioned substantially as shown in FIG. 3.
Figure 8:
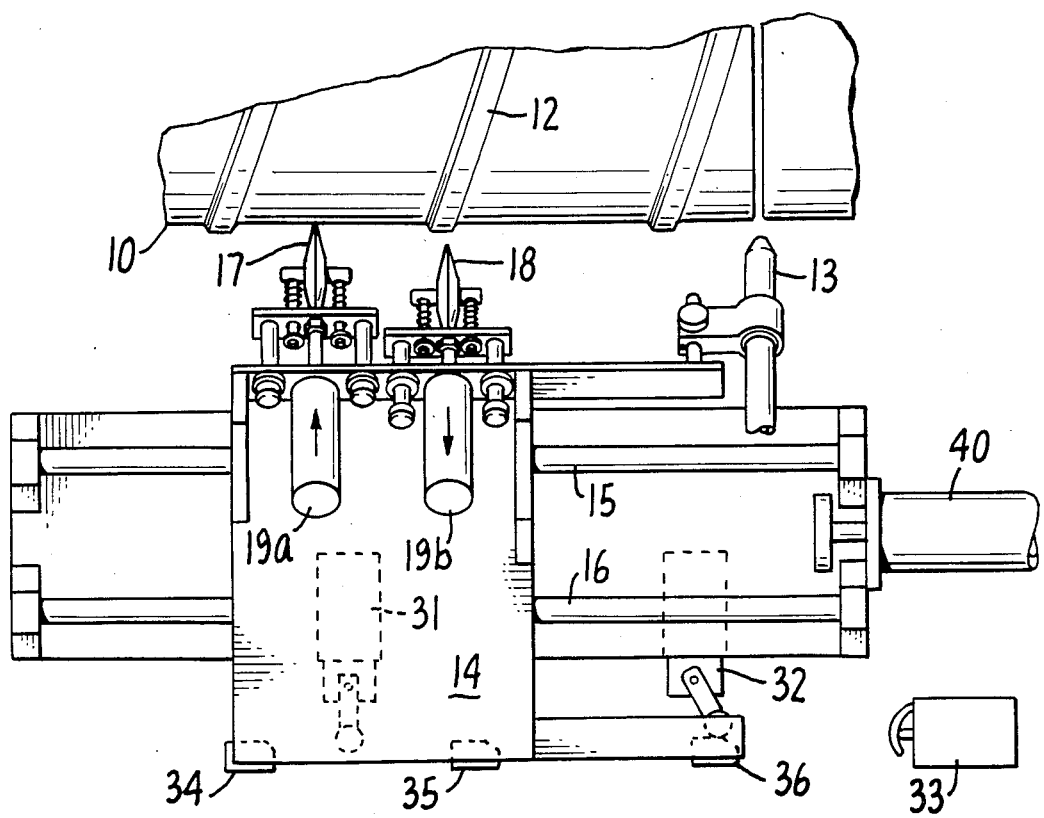
FIGS. 8, 9 and 10 are side views of the apparatus showing different positional relationships of the rollers and carriage relative to the pipe.
Figure 6:
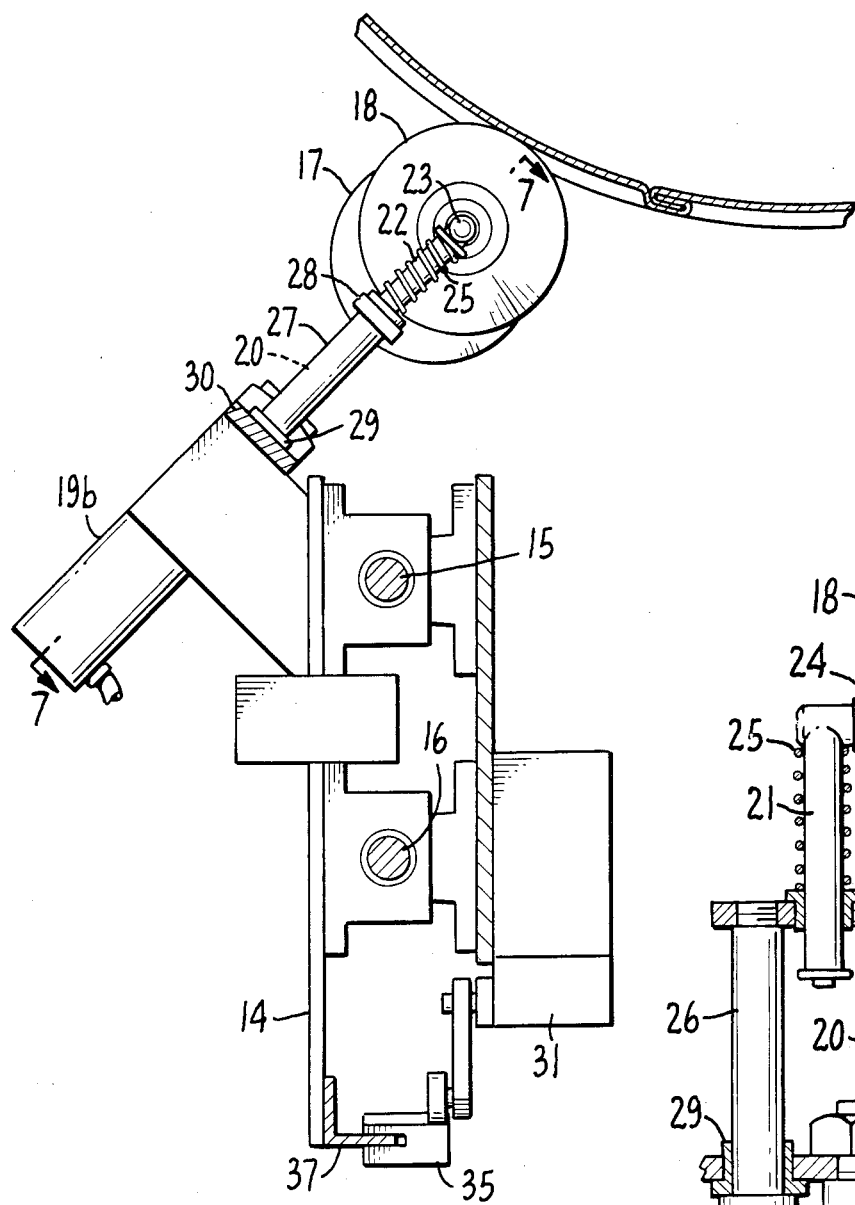
FIG. 6 is a section taken on lines 6—6 of FIG. 5.
Figure 7:
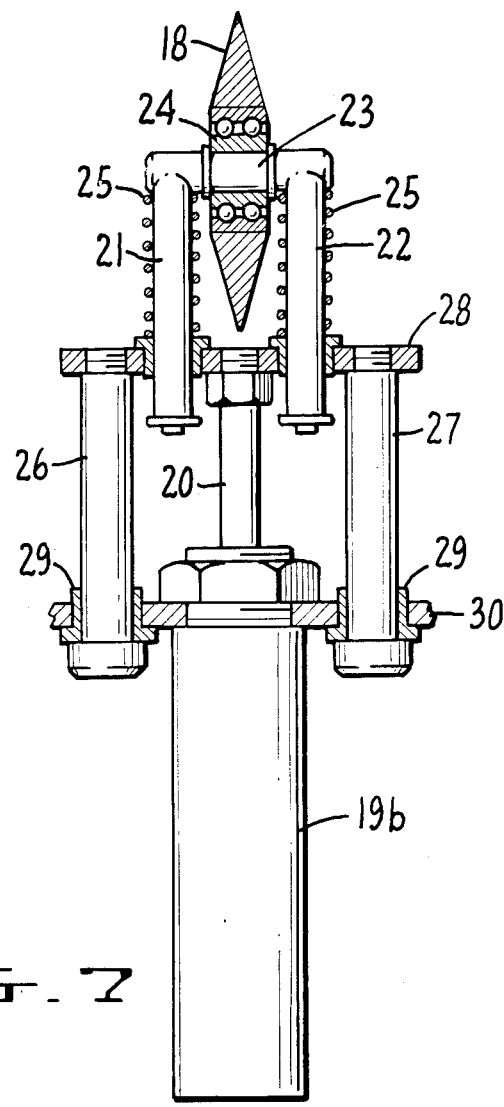
FIG. 7 is an enlarged detail taken on the line 7—7 of FIG. 6.
Figure 9:
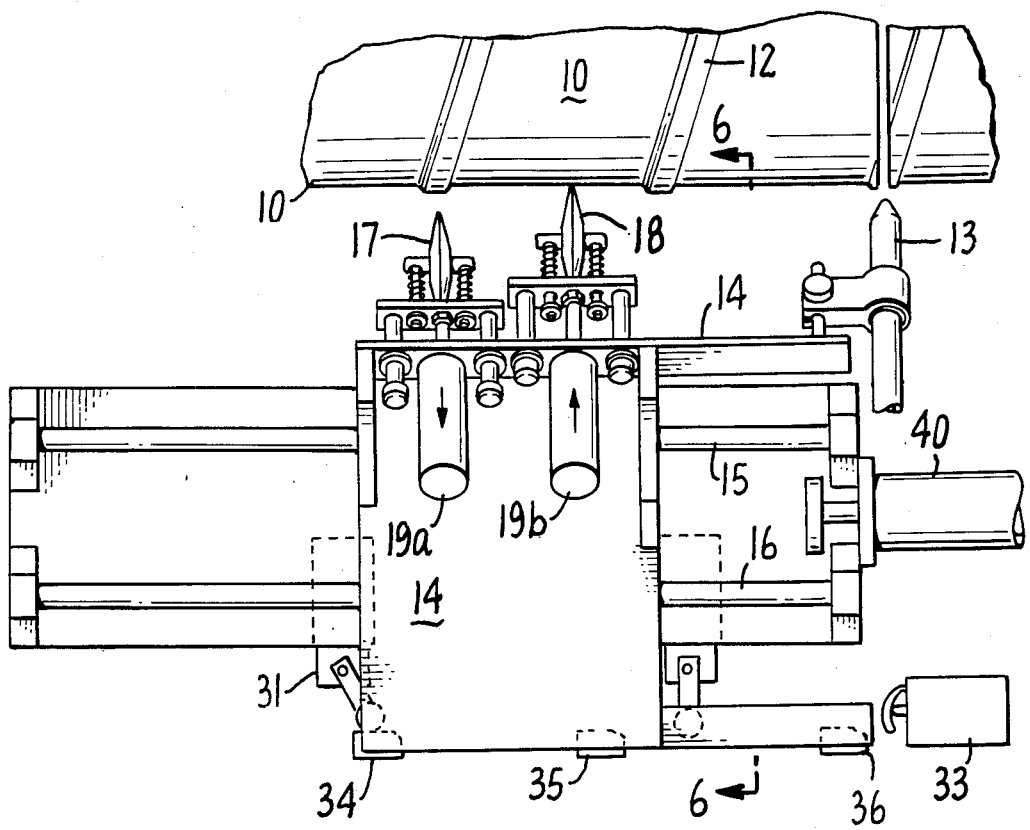

Referring to FIGS. 1, 2 and 3 in particular, there is shown a helical pipe 10 in the process of its manufacture from strip material 11. In the conventional manner, strip material 11 is helically coiled, each coil of the strip material being seamed or connected to an adjacent coil, resulting in a helical seam 12. While the pipe manufacturing process is carried out, sections of pipe are cut-off on the fly by means of a torch 13. This invention more particularly relates to the mechanism by which torch 13 is advanced longitudinally parallel with the axis of pipe 10 as the pipe is being formed.

Torch 13 is mounted on a carriage 14 which itself is supported upon a pair of rails 15 and 16. Carriage 14 also supports a pair of knife-edge rollers 17 and 18. Rollers 17 and 18 are mounted from the carriage upon actuating mechanisms 19a and 19b that are adapted for moving each roller into and out of engagement with the pipe independently of the other. Each actuating mechanism comprises a cylinder having a reciprocating rod 20 that supports a roller through a cushion mounting comprising a pair of guide rods 21 and 22, a support shaft 23, a ball bearing race 24 and a pair of helical springs 25. Reciprocation of each rod 20 is stabilized by a pair of guide rods 26 and 27 which are secured to the end of the rod by a plate 28. Rods 26,27 are slidably received in bearings 29 mounted in a plate 30 affixed to the body or cylinder of each actuating mechanism.

The operation of cylinders 19a and 19b is controlled by a plurality of limit switches 31,32,33 and a plurality of contacts 34,35,36. Each limit switch is mounted to a support adjacent carriage 14 and each of the contacts 34,35,36 is secured to a rail 37 affixed to the carriage. Each contact may be adjustably positioned along the rail, the position of each being a determining factor in operating an associated limit switch and the actuation of actuating mechanism 19a, 19b.

Figure 10:
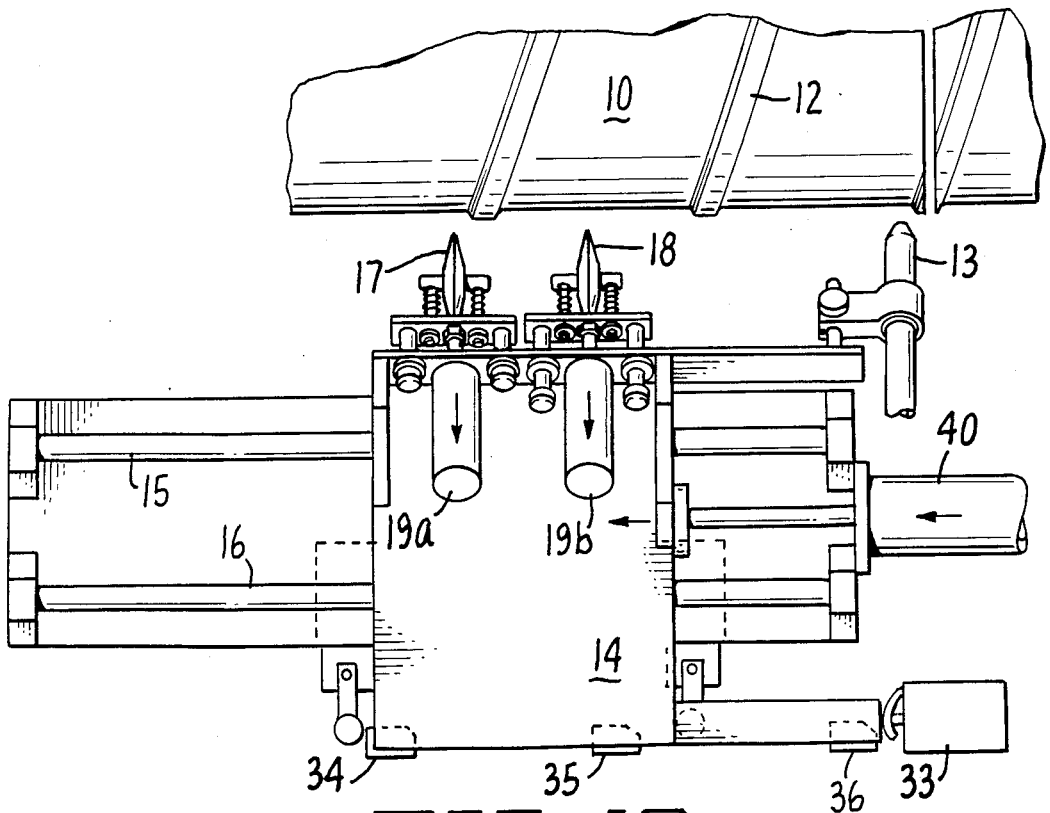

As carriage 14 is advanced toward the right, as shown in FIG. 1, limit switch 31 is operated by contacts 34 and 35 to control the operation of cylinder 19a through a pneumatic control 38; limit switch 32 is operated by contact 36 to control cylinder 19b through a pneumatic control 39; and both pneumatic controls 39 and 39 are subject to an override under the control of limit switch 33 and its engagement with contact 36, as shown in FIG. 10.

With reference to FIG. 10, it will be noted that when switch 33 is actuated by contact 36 both cylinder 19a and cylinder 19b are operated to retract the knife rollers 17 and 18 from the surface of the pipe. This allows the carriage to be returned to its "home" position for repeating cycling and cut-off. An air cylinder 40 is provided for the purpose of returning the carriage, together with the torch 13, knife rollers 17 and 18 and their respective actuating mechanisms, to the "home" position. In the preferred operation, cylinder 40 is reciprocated shortly after one full cycle contact is made between limit switch 33 and contact 36 and after cut-off. A delay circuit operated by limit switch 33 may be used for this purpose. This returns the carriage to its home position for further cut-off operations.

The initiation of each cut-off cycle may be manually controlled or, in the alternative, sensor devices may be positioned to initiate cut-off after a certain length of pipe has been manufactured. Referring to FIG. 3, there is shown a pair of sensors 41 and 42 which cooperate in a controlled cycle to slow down the speed of pipe manufacture and advancement and then to initiate cut-off. Sensor 41 first senses the lead end of the pipe to slow down pipe manufacture and, after a suitable delay time, sensor 42 senses the lead end to initiate cut-off. At this time, pneumatic control 39 is conditioned to place knife roller 18 into engagement with the pipe, initiating cut-off.

The operation of actuating cylinders 19a and 19b will be more clearly understood by reference to FIG. 4. At the beginning of each cut-off cycle, only knife roller 18 is in contact with the advancing pipe. After knife roller 17 is clear of seam 12, which passes beneath as the pipe advances with rotation, contact 35 moves past limit switch 31, operating control 38 to actuate cylinder 19a and place knife roller 17 into engagement with the pipe. As knife roller 18 approaches seam 12, contact 36 operates limit switch 32, operating control 39 and actuating cylinder 19b, causing knife roller 18 to be retracted until the seam passes beneath. Thereafter, both rollers 17 and 18 are in contact with the pipe until contact 34 operates limit switch 31, again causing roller 17 to be retracted. The double actuation of roller 17 is desirable, if not necessary, to assure complete severing of the pipe by extending the cut-off period slightly beyond one full rotation of the pipe.

Although a preferred embodiment of the invention has been illustrated and described, various modifications and changes may be resorted to without departing from the spirit of the invention or the scope of the appended claims, and each of such modifications and changes is comtemplated. As one example, knife rollers 17 and 18 may be actuated several times during each cut-off cycle, allowing the rollers to pass over a multi-ribbed pipe in the course of its manufacture.

What is claimed is:

1. An apparatus for advancing a cut-off mechanism with a helically formed pipe as the pipe is manufactured comprising:

a carriage mounted for travel along a path parallel to the axis of the pipe that is being formed;

a first pipe engaging means mounted on said carriage and movable therewith, said means including a first roller having a knife edge and first actuating mechanism for moving said first roller into and out from engagement with the pipe;

a second pipe engaging means mounted on said carriage and movable therewith, said means including a second roller having a knife edge and a second actuating mechanism for moving said second roller into and out from engagement with the pipe;

said first and second rollers being rotatably mounted on axes parallel to the axis of pipe being formed and spaced apart along the pipe, each contact roller rotating upon its axis while engaged with the pipe and movable axially with the pipe;

and a control means for selectively operating said first and second actuating mechanism and placing at least one roller in engagement with the pipe, each contact roller rotating upon its axis while engaged with the pipe and movable axially with the pipe;

whereby said first and second rollers are selectively disengaged from contact with the pipe to allow a seam or other obstruction to pass without contact.

2. The apparatus of claim 1, and a cut-off torch mounted on said carriage, said carriage, first and second pipe engaging means and torch being moved along said path as the pipe is being formed by rotation and axial advancement.

3. The apparatus of claim 1, said control means comprising a plurality of limit switches mounted adjacent said carriage, one limit switch being operably associated with said first actuating means, a second limit switch being operably associated with said second actuating means and a third limit switch operably associated with both said first and second actuating means; and a plurality of contacts movable with said carriage and engageable with said limit switches, respectively, for operating said limit switches and actuating mechanism as said carriage travels along said path; whereby an engagement by one of said contacts with said one limit switch operates said first actuating means, an engagement by a second one of said contacts with said second limit switch operates said second actuating means, and an engagement by a third one of said contacts with said third limit switch operates both first and second actuating means.

4. The apparatus of claim 3, said contacts being adjustably mounted in a direction parallel to said path, thereby allowing for timing adjustments in the operations of said limit switches and actuations of said first and second actuating mechanisms.

5. The apparatus of claim 1, and further comprising return means for moving said carriage to a "home" position for repeating cut-off advancements; and control means including a limit switch for actuating said return means after predetermined advancement of said carriage.

6. The apparatus of claim 5, said return means comprising a fluid cylinder having a piston rod positioned parallel to the axis of pipe that is being formed, whereby actuation of said cylinder returns said carriage to a "home" position upon actuation of said limit switch.

7. The apparatus of claim 1, and further comprising sensor means for sensing the lead end of pipe that is being formed, said means being positioned a predetermined distance in advance of said first and second pipe engaging means; and control means operated by said sensor means to slow down the speed of pipe manufacture and to initiate cut-off.

* * * * *